United States Patent [19]

Corcoran

[11] Patent Number: 4,925,246
[45] Date of Patent: May 15, 1990

[54] PRISONER RESTRAINT SYSTEM

[76] Inventor: Dan E. Corcoran, 8310 SW. Greenway, No. 45, Beaverton, Oreg. 97005

[21] Appl. No.: 257,997

[22] Filed: Oct. 14, 1988

[51] Int. Cl.⁵ ............................................. A47C 7/00
[52] U.S. Cl. ................................. 297/466; 128/869; 297/460; 297/464
[58] Field of Search ............... 297/460, 464, 466, 284; 128/869, 870, 874

[56] References Cited

U.S. PATENT DOCUMENTS

| | | | |
|---|---|---|---|
| 1,210,223 | 12/1916 | Gilbert | 297/460 |
| 2,970,638 | 2/1961 | Halter | 297/460 X |
| 3,165,355 | 1/1965 | Hitchcock, Jr. et al. | 297/460 X |
| 3,205,010 | 9/1965 | Schick | 297/460 |
| 3,612,605 | 6/1971 | Rosey | 297/485 X |
| 3,804,461 | 4/1974 | Kienel | |
| 3,947,058 | 3/1976 | Laporte | |
| 3,982,769 | 9/1976 | Farland | |
| 4,300,249 | 11/1981 | Taylor | 297/460 X |
| 4,576,414 | 3/1986 | Molnar et al. | |
| 4,726,605 | 2/1988 | Carter | |
| 4,728,119 | 3/1988 | Sigafoo | 297/487 X |
| 4,753,482 | 6/1988 | Warren | 297/460 X |
| 4,813,745 | 3/1989 | Woody | 297/464 |

FOREIGN PATENT DOCUMENTS 1373267 8/1964 France .............................. 297/460

*Primary Examiner*—Peter R. Brown
*Attorney, Agent, or Firm*—Chernoff, Vilhauer, McClung & Stenzel

[57] ABSTRACT

A contoured vehicle seat back and a belt restraint which cooperate to safely secure and immobilize a rearwardly handcuffed prisoner for transport is disclosed. The contoured seat back includes a pair of downwardly converging channels therein for receiving and engaging the arms of the occupant. A central lower pocket for receiving the cuffed hands of the occupant is recessed into the seat back proximate the lower extremities of the channels. The belt restraint includes a cinching handle detachably mounted to the seat belt latching mechanism which can be detached from the latching mechanism and used to tighten the seat belt urging the occupant into engagement with the contoured seat back.

16 Claims, 4 Drawing Sheets

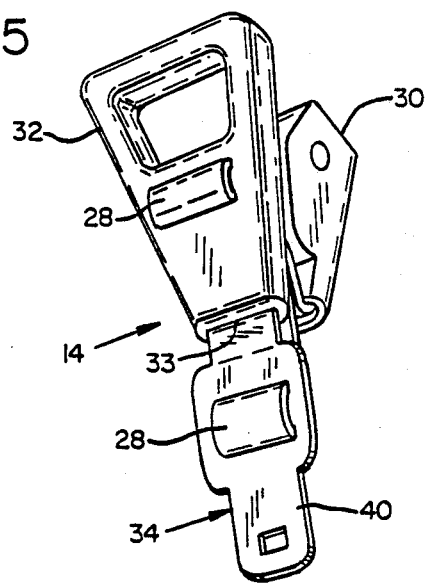
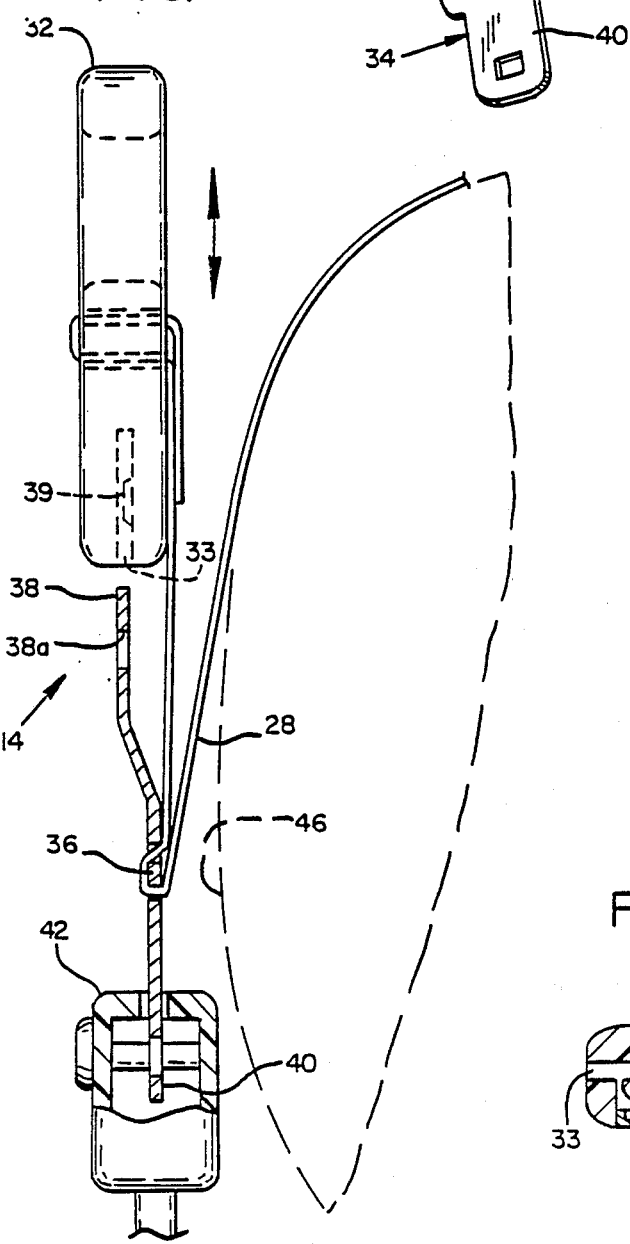
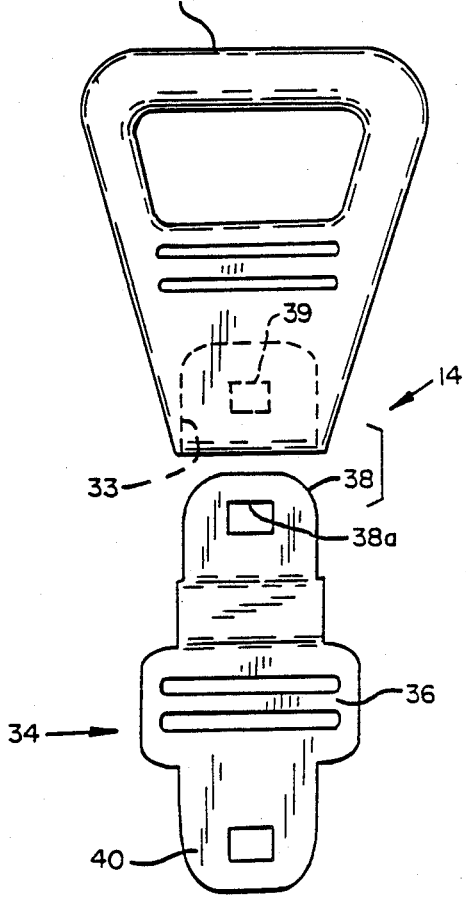
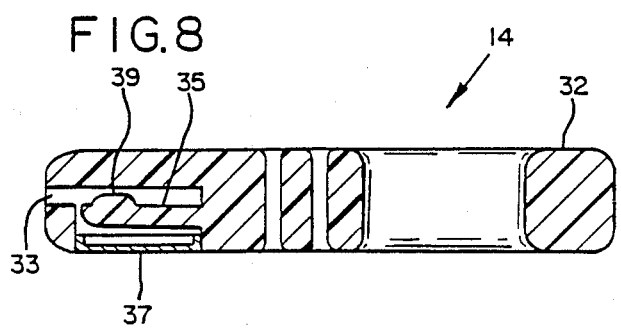

PRISONER RESTRAINT SYSTEM

BACKGROUND OF THE INVENTION

The present invention relates to a prisoner restraint system for transporting prisoners in a vehicle, and more particularly to a contoured transport seat back and cooperating restraint assembly for supporting and substantially immobilizing a rearwardly handcuffed prisoner while seated in a vehicle.

The transport of prisoners while in the custody of law enforcement personnel presents numerous risks to the safety of both the officers and prisoners involved. When not effectively restrained rearwardly handcuffed prisoners are subject to injury from potentially violent contact with the interior of the vehicle passenger compartment, particularly when the vehicle decelerates abruptly or negotiates roadway turns. With their hands cuffed behind them, prisoners are unable to use their hands or arms for lateral support. Further, such prisoners are frequently intoxicated, under the influence of drugs, ill or otherwise incapacitated thereby further limiting their capacity to maintain a fully upright seated position. Such incapacitated persons are subject to vomiting, increasing risk of suffocation if the subject is not maintained upright.

Traditional belt restraints in cooperation with traditional rear seat configurations fail to provide sufficient lateral support to a rearwardly cuffed prisoner. Prisoners could slip down in the seat so that the belt could become entangled around their necks. Rearwardly handcuffed prisoners are also subject to injury to the arms, shoulders, wrists or back when restrained by seat and shoulder belts in traditional rear seats with hands pinned between the prisoner and the seat back.

When not effectively restrained, prisoners are an obvious potential risk to the safety of law enforcement personnel during transport. The officer is particularly at risk when in close proximity while reaching across the prisoner with both hands to secure a traditional belt restraint.

Traditional fabric seats present costly maintenance problems. Such seats are easily torn by the handcuffs worn by the prisoners occupying the vehicles. Further, it is not uncommon for such prisoners to discharge bodily fluids which are difficult to remove from fabric traditional upholstery. Traditional seats typically define an opening between the seat back and seat bottom where weapons or other contraband can be hidden by the prisoners occupying the seat.

These and other problems result in increased maintenance time for law enforcement vehicles, increased risk of bodily injury to law enforcement personnel, and increased liability on the part of governmental agencies for injuries sustained by those taken into custody.

In recent years, single-piece, hard-surfaced rear seats have been introduced in police and similar vehicles in an attempt to eliminate some of the deficiencies encountered in the use of traditional rear seats and prior art belt restraints. Such assemblies do have certain advantages over conventional seats, particularly in connection with ease of cleaning and prevention of hidden contraband. Such rear seats, however, fail to effectively immobilize in an upright position a seated prisoner for transport and fail to minimize an officer's proximity to a prisoner while engaging and tightening a belt restraint around such a potentially dangerous individual. In fact, the hard slippery surface of such seats increase the likelihood that hand-cuffed prisoners will slide along the seat or be thrown about in the rear of the police vehicle.

SUMMARY OF THE INVENTION

The present invention is directed toward a prisoner transport seat back and a belt restraint assembly which cooperate to immobilize a seated, rearwardly handcuffed prisoner in an upright position. This is accomplished according to the present invention by providing a contoured seat back having a pair of brace portions which engage the arms of the prisoner to provide lateral support. The seat back further includes a pocket means intermediate the brace portions for receiving the cuffed hands of the prisoner.

According to the exemplary embodiment of the invention, the seat back defines a substantially upright face having a pair of downwardly converging channels and a lower pocket formed therein. In this embodiment a belt-type restraint means cooperates with the channels to maintain the prisoner in cooperative engagement with the seat back and provides frontal support to the prisoner. A preferred embodiment of restraint means is a seat belt assembly extending diagonally across the torso of the prisoner, the seat belt assembly including a latch for engaging a receptacle secured to the vehicle. The latch includes a cinch for engaging and tightening the belt. The belt is secured at one end to the vehicle and at the opposite end to a cinching handle which is detachably mounted to the latch.

Accordingly, it is a principal object of the present invention to provide a contoured transport seat back which is adapted to provide lateral support to a rearwardly handcuffed prisoner.

It is an accompanying object of the present invention to provide a contoured transport seat back which is adapted to receive the rearwardly cuffed hands of a prisoner.

It is an associated object of the present invention to provide means for engaging the shoulders of a prisoner so as to resist upward prisoner movement.

It is a further object of the present invention to provide restraint means adapted to provide frontal support to a prisoner.

It is a further object of the present invention to provide a seat belt assembly which cooperates with a transport seat back to restrain a prisoner rearwardly, frontally and laterally.

It is a still further object of the present invention to provide a seat belt assembly which can be selectively engaged and tightened using only one hand.

It is yet another object of the present invention to reduce the exposure of law enforcement personnel to a potentially dangerous prisoner during the engagement of a seat belt restraint across the individual.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5 is a perspective view of a portion of the exemplary seat belt assembly of the present invention in a fully retracted position showing the latch, cinching handle, and spool.

FIG. 6 is a plan view of the exemplary latch and cinching handle shown in FIG. 5.

FIG. 7 is a partially sectional side elevational view of the exemplary buckle, latch, and cinching handle showing the belt positioned across the torso of an occupant.

FIG. 8 is a side sectional view of an alternative exemplary cinching handle.

DETAILED DESCRIPTION OF THE INVENTION

Figure 1:
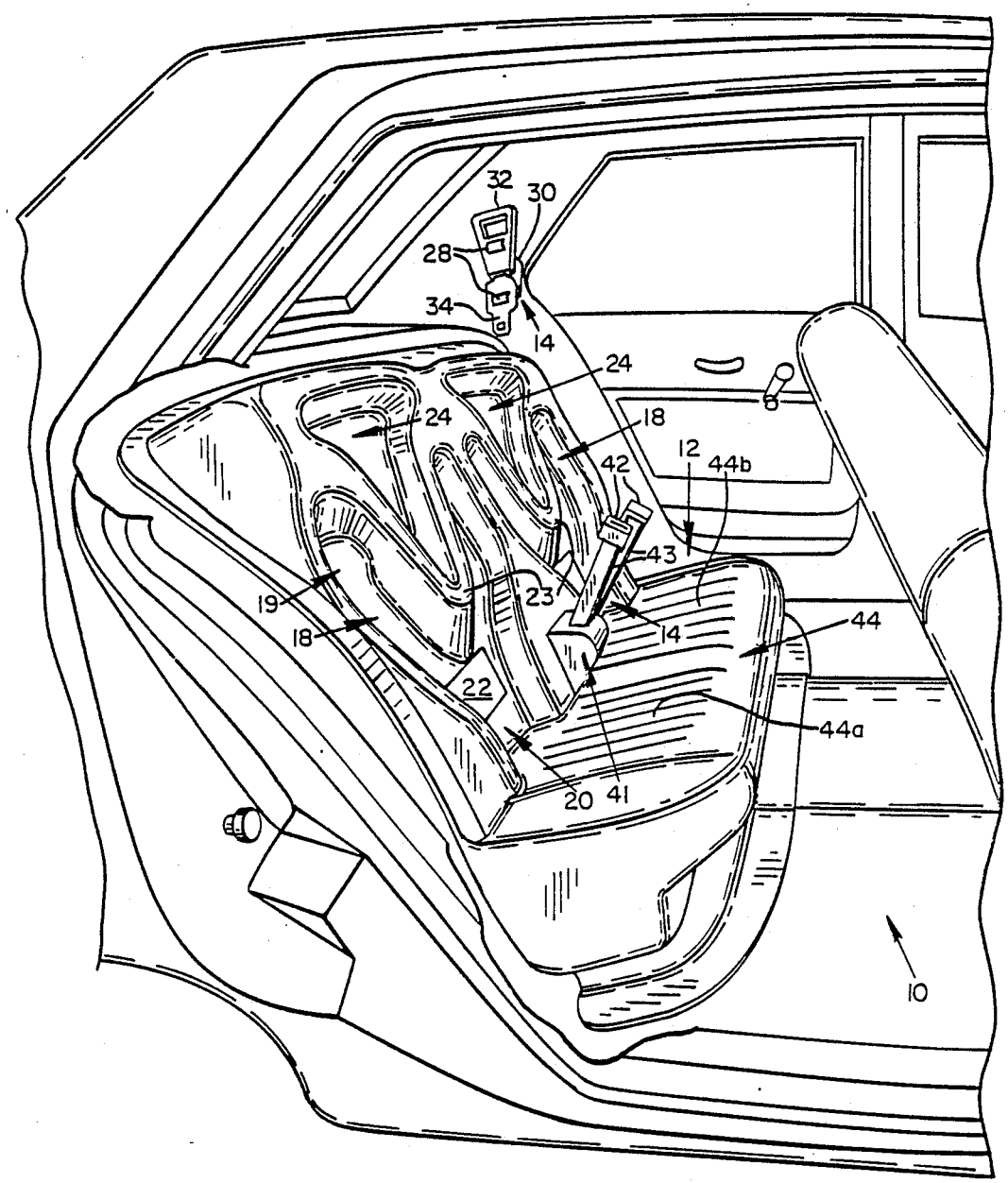
FIG. 1 is a perspective view of an exemplary embodiment of a prisoner transport system according to the present invention installed in the rear passenger compartment of a forcement vehicle.

Referring to FIG. 1, the rear passenger compartment 10 of a vehicle used to transport prisoners is shown. The compartment includes an exemplary retrofitted seat 12 and exemplary belt restraint assembly 14, which cooperate to support and restrain a seated, rearwardly handcuffed prisoner frontally, rearwardly, and laterally.

Figure 2:
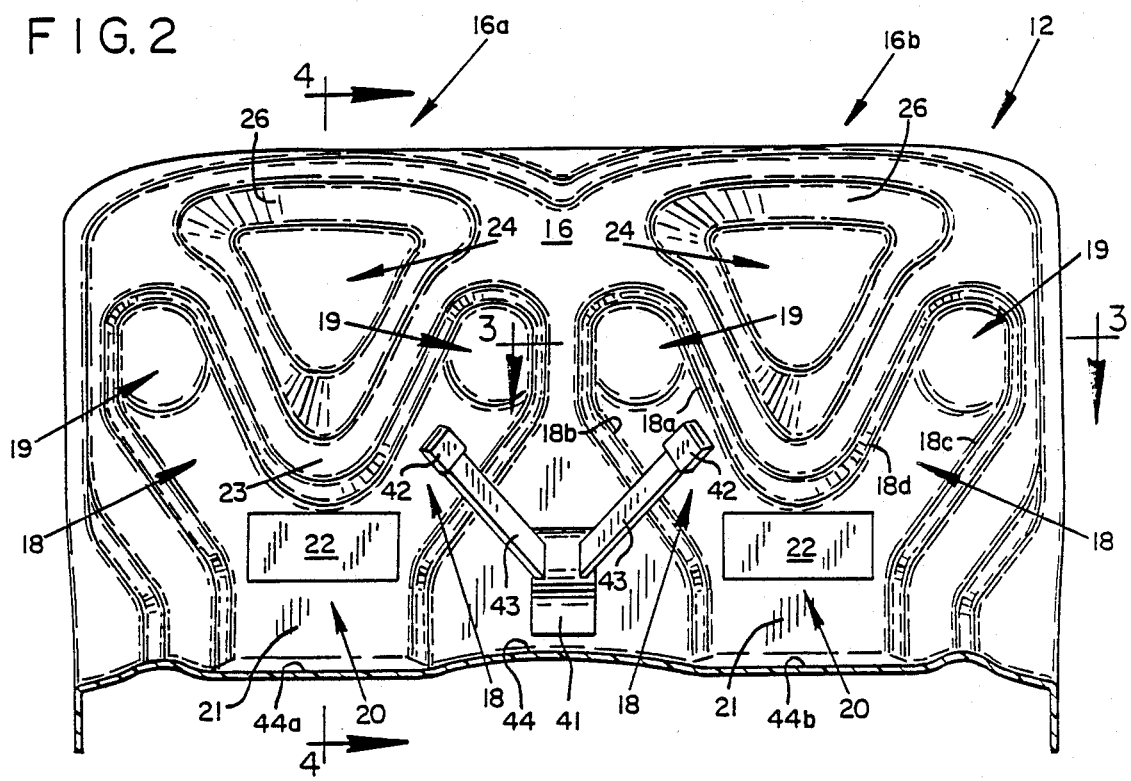
FIG. 2 is a front elevational view of the contoured seat back portion of the exemplary prisoner transport system shown in FIG. 1.

The exemplary seat 12 is of a single piece, resin-impregnated silicon fiber sheet mesh construction. As best seen in FIG. 2 the seat includes a substantially upright face 16 having a pair of contoured seat backs 16a, 16b formed therein for accommodating two occupants in the passenger compartment 10. Each contoured seat back includes a pair of downwardly converging channels 18 in the upright face of the seat back for receiving and engaging the forearms of a prisoner. The upper extremities of the channels 18 each include an elbow recess 19 for receiving the occupant's elbows. Proximate the converging lower extremities of the channels 18, an intermediate lower recessed portion defines a pocket 20 for receiving the cuffed hands of the prisoner. The pocket includes a sink 22 which defines an approximately ¼" recess into the pocket. The sink is filled with a resiliently deformable padding, such as foam rubber, to present a flush exterior pocket surface. The padding cushions the hands and wrists of the occupant and provides additional space to accommodate the handcuffs. As may be seen in FIG. 4, in the exemplary embodiment, the lower pocket portion 21 forms the portion of the pocket most deeply recessed in the face of the seat back. For example, the lower pocket portion 21 and elbow recesses 19 are approximately equally indented into the face 16 of the seat back.

Figure 3:
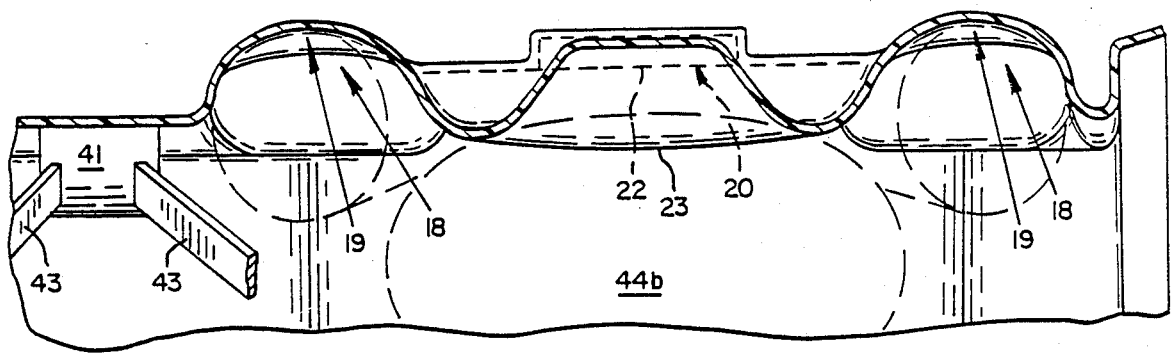
FIG. 3 is a partial sectional plan view of the exemplary seat back taken along lines 3—3 of FIG. 2.
Figure 4:
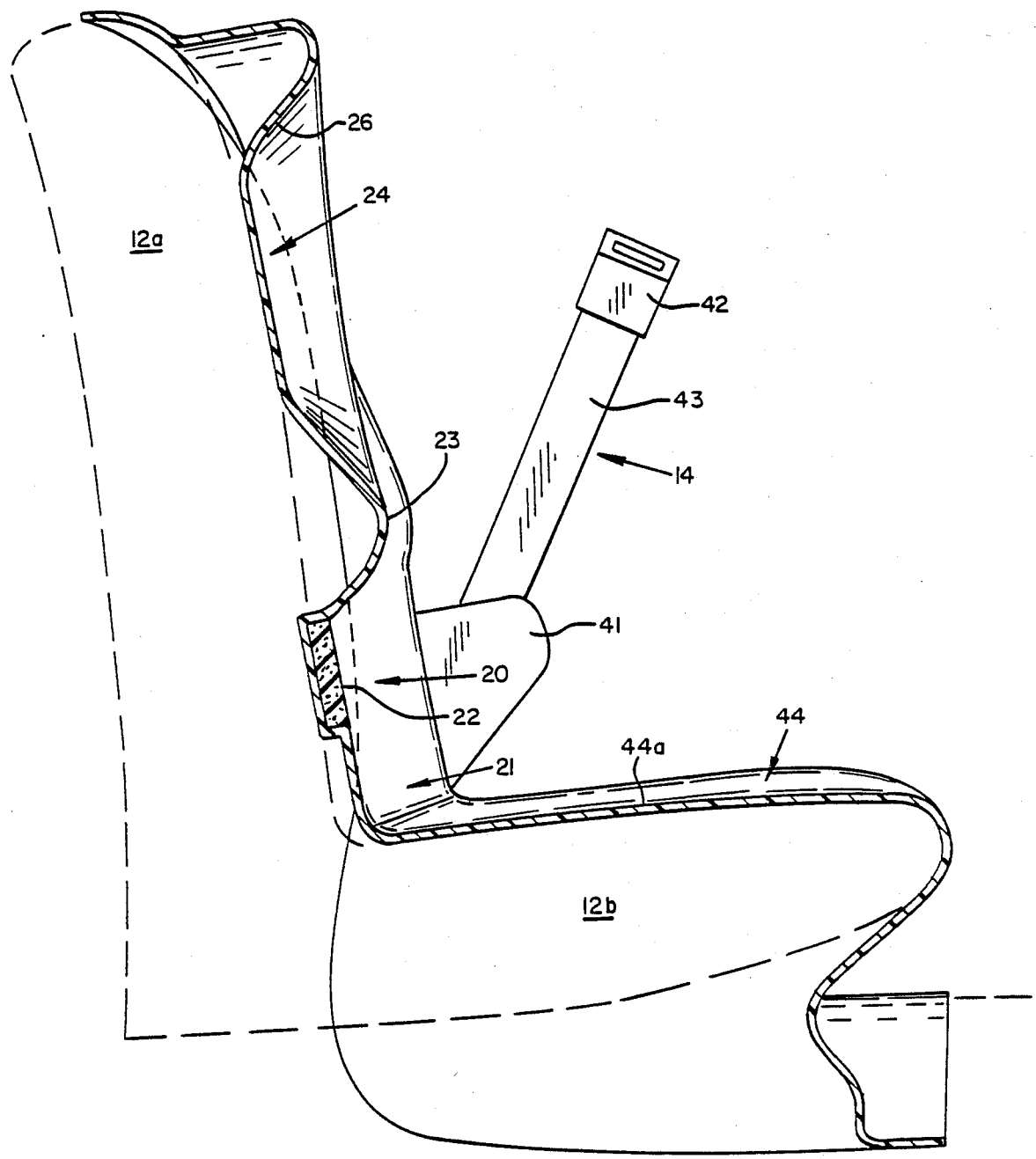
FIG. 4 is a sectional view of the exemplary seat back taken along lines 4—4 of FIG. 2.

The seat back face 16 includes a raised protuberance 23, best seen in FIGS. 3 and 4, for supporting the lower middle back of the occupant. A substantially triangular upper recessed portion 24 is located between the diverging upper extremities of the channels 18 for receiving the shoulder blades of the occupant. Referring particularly to FIG. 4, an upper lip 26 protrudes horizontally outwardly of the face 16 providing a downwardly counteracting surface for engaging the shoulders of the occupant and thereby resisting upward movement.

Returning to FIG. 1, the seat also includes a rearwardly downwardly sloping seat bottom 44 which defines a pair of identical laterally concave troughs 44a, 44b each of which is associated with a respective seat back 16a, 16b. The side walls of the troughs provide lateral counterforce surfaces which serve to resist lower body lateral movement. The troughs allow additional headroom for the occupants. As shown in FIG. 4 the seat back 12a and seat base 12b each define respective central axes which preferably intersect at a 90° angle. The rearward, downward slope of the seat bottom 44 serves to urge the back of the occupant into engagement with the upright face 16 of the seat back 12a and resist forward sliding of the lower body of an occupant. The troughs 44a, 44b are provided with a textured surface to further resist sliding of the lower body of the occupant.

According to the exemplary embodiment of the invention, the occupant is frontally supported using an adjustable seat belt assembly 14 which, when tightened, urges the prisoner into cooperative engagement with the contoured seat back 16a, 16b. The seat belt assembly 14, as seen in FIGS. 1, 5, 6, 7 and 8, includes a belt 28 having one end secured to a retractable spool 30. The spool is attached by a mounting bolt to a standard plug in an adjacent wing wall of the vehicle. The spool 30 includes conventional pin lock means for locking the belt at a desired length of extension.

The unsecured end of the belt is directly connected to a cinching handle 32 as seen in FIG. 7. The seat belt assembly 14 also includes a latch 34 which includes a cinch 36 for engaging and tightening the belt, a handle engaging tang 38 for detachably engaging the cinching handle, and a latching portion 40 for mating engagement with a buckle 42 secured to the vehicle. As best shown in FIG. 7, the latching portion and cinch 40, 36, respectively, of latch 34 are substantially coplanar. The handle-engaging tang 38 is offset from the plane of the latch so as to project outwardly of the occupant. The handle-engaging tang includes an aperture 38a for mating engagement with a resilient button 39 within a slot 33 in handle 32. The resilient button may be of fabric such as Velcro ™, rubber, or any other material which will interengage with the aperture 38a to provide some resistance to removal of the cinching handle from the supporting tang. FIG. 8 shows an alternative cinching handle 32 molded out of plastic having an integral arm 35 with a button 39 formed thereon. The arm is resiliently movable so as to enable the button to engage and disengage from the aperture 38a in the tang 38. Access to the resilient arm is provided by a cap 37 which snaps over the well containing the arm.

As seen in FIGS. 1, 2 and 4 the buckle 42 of the belt assembly is supported outwardly of the seat by a semi-rigid belt projection 43 having a flexible segment proximate the buckle. The end of each belt projection opposite the buckle is mounted to a bracket 41 which is secured to the vehicle. The buckle 42 may include a guide for directing the male latching portion 40 of the latch into the female receptacle of the buckle.

In operation, a rearwardly cuffed prisoner is seated in the passenger compartment 10 and positioned for cooperative engagement with one of the seat backs 16a, 16b. When so positioned, the forearms of the prisoner are received in the downwardly converging channels 18. The law enforcement officer then grasps the cinching handle 32, which is attached to latch 34 as shown in FIGS. 1 and 5, with one hand and directs the latching portion 40 diagonally across the chest of the occupant toward the buckle 42. The belt 28 is drawn out of the retractable spool 30 and positioned diagonally across the chest of the occupant. The latching portion 40 is then inserted into the buckle 42 and retained therein by operation of the buckle. The cinching handle 32 may then be disengaged from the latch 34 by pulling the cinching handle away from the buckle 42 as shown in FIG. 7 thereby overcoming and releasing the engagement between the aperture 38a and the button 39 within slot 33 of the cinching handle. Following this release of the handle, continued pulling by the officer in the direction shown draws an residual belt slack through the cinch portion 36 thereby urging the prisoner into cooperative engagement with the contoured seat back. When the belt is fully tightened, the cinching handle 32 may be remounted to the handle receiving tang 38 of latch 34. The belt retains the occupant in cooperative engagement with the channels 18, pocket 20, upper recessed portion 24 and upper lip 26, thereby safely and effectively immobilizing the prisoner for transport. In particular, the prisoner is provided with lateral support by the engagement of the forearms with channel walls 18a, 18c when the vehicle negotiates right-hand turns or channel walls 18b, 18d when the vehicle negotiates left-hand turns. The channel walls provide lateral counterforce surfaces having a vertical component to resist lateral movement of the occupant.

The outward offset of the handle-engaging tang 38 maintains the handle 32 away from the body of the occupant thereby preventing potentially harmful contact between the occupant and handle during transport, and facilitating engagement and removal of the cinching handle with the tangs.

The seat 12 may also be used as a conventional seat to transport persons not handcuffed or those handcuffed in front. In such applications the protuberance 23, the upper recessed portion 24 and the upper lip 26 comfortably engage the lower back, shoulder blades and shoulders, respectively, of an occupant.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A seat back for providing lateral and rearward support to a rearwardly handcuffed occupant comprising:
   (a) an upright face for engaging the back of said occupant, said face including an upper portion and a lower portion; and
   (b) pocket means arranged centrally in said lower portion of said face for receiving the rearwardly cuffed hands of the occupant, said pocket means defining a space between said seat back and the back of the occupant when the back of the occupant rests securely against said face of said seat back.

2. The seat back of claim 1, said face further including a pair of laterally opposed, left and right, brace means above said pocket means for respectively engaging a forearm of the rearwardly handcuffed occupant and providing the occupant with lateral support by engagement of the occupant's forearms with said brace means.

3. The seat back of claim 2 wherein said left and right brace means respectively include left and right bracing surfaces each having a vertical component, said left and right bracing surfaces respectively acting as left and right counterforce means for resisting lateral movement of the occupant.

4. The seat back of claim 3 wherein said left and right bracing surfaces are arranged on said lower portion of said face of said seat back so as to converge downwardly toward said pocket means.

5. The seat back of claim 2 wherein said left and right brace means are arranged on said lower portion of said face of said seat back so as to converge downwardly toward said pocket means.

6. The seat back of claim 5 wherein said left and right brace means extend substantially to said pocket means.

7. The seat back of claim 2 wherein said left and right brace means include left and right channels formed in said face of said seat back.

8. The seat back of claim 2 wherein said face includes a central raised portion located above said pocket means and between said left and right brace means.

9. The seat back of claim 2 wherein said upper portion of said face includes upper recessed means for receiving the shoulder blades of the occupant, said upper recessed means including a substantially horizontally oriented upper lip means for engaging the shoulders of the occupant and resisting upward movement of the occupant when the back of the occupant rests securely against the face of the seat back.

10. The seat back of claim 2 further comprising frontal restraint means cooperating with said face of said seat back for maintaining the forearms of the occupant in close engagement with said brace means by immobilizing the forearms between said brace means and the back of the occupant.

11. The seat back of claim 10 wherein said frontal restraint means includes adjustable means for urging and retaining the occupant into close engagement with said brace means.

12. The seat back of claim 10 wherein said frontal restraint means includes a belt.

13. The seat back of claim 2 including a seat bottom which slopes downwardly towards said seat back to urge said occupant into engagement with said face of said seat back.

14. The seat back of claim 13 wherein said seat bottom includes laterally concave trough means for resisting lateral sliding of the lower body of the occupant.

15. A seat back for providing lateral and rearward support to a rearwardly handcuffed prisoner comprising:
   (a) an upright face for engaging the back of said occupant, said face including an upper portion and a lower portion;
   (b) said lower portion of said seat back including a pair of left and right, laterally opposed, brace means for respectively engaging the left and right forearms of the occupant when the hands of the occupant are cuffed behind the occupant's back, said left and right brace means arranged on said lower portion of said seat back so as to converge downwardly toward each other; and
   (c) wherein said left and right brace means converge downwardly toward central pocket means in said lower portion of said face for receiving the rearwardly cuffed hands of said occupant, said pocket means defining a space between said seat back and the back of the occupant when the back of the occupant rests securely against said face of said seat back.

16. A seat back for providing lateral and rearward support to a rearwardly handcuffed prisoner comprising:

(a) an upright face for engaging the back of said occupant, said face including an upper portion and a lower portion;
(b) said lower portion of said seat back including a pair of left and right, laterally opposed, brace means for respectively engaging the left and right forearms of the occupant when the hands of the occupant are cuffed behind the occupant's back, said left and right brace means arranged on said lower portion of said seat back so as to converge downwardly toward each other; and
(c) wherein said left and right brace means include left and right channels formed in said face of said seat back.

* * * * *

UNITED STATES PATENT AND TRADEMARK OFFICE
CERTIFICATE OF CORRECTION

PATENT NO.   :   4,925,246
DATED        :   May 15, 1990
INVENTOR(S)  :   Dan E. Corcoran It is certified that error appears in the above-identified patent and that said Letters Patent is hereby corrected as shown below:

Col. 2, Line 68:   Change "a forcement vehicle" to -- law enforcement vehicle--

Col. 5, Line 7:    Change "an" to --any--

Signed and Sealed this

Tenth Day of September, 1991

Attest:

HARRY F. MANBECK. JR.

Attesting Officer

Commissioner of Patents and Trademarks